May 22, 1962 E. C. BEASON, JR 3,035,595
FLUID HANDLING STRUCTURE
Filed Oct. 30, 1958 2 Sheets-Sheet 1
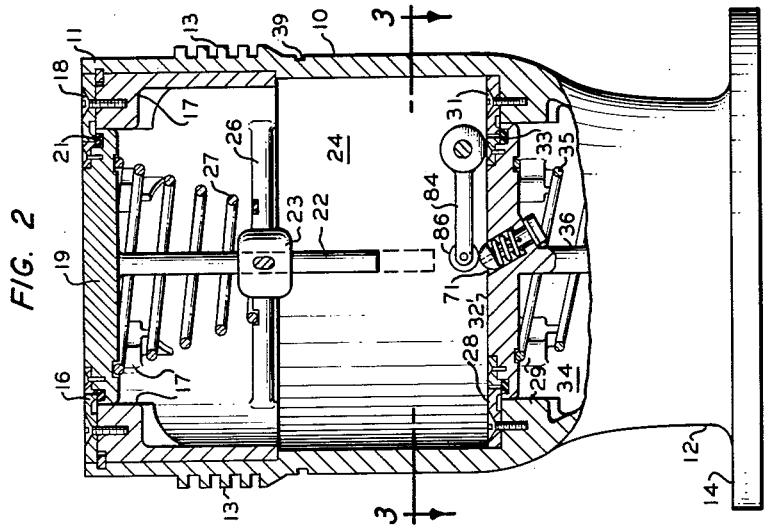
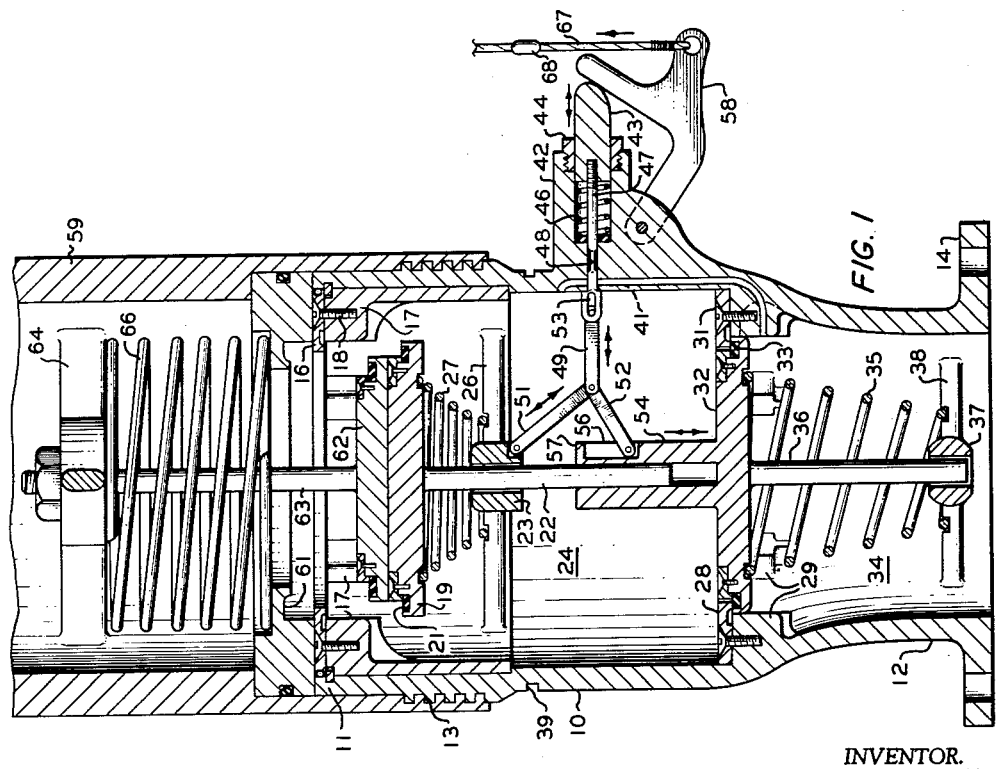
INVENTOR.
E.C. BEASON, JR
BY *Hudson and Young*
ATTORNEYS United States Patent Office 3,035,595
Patented May 22, 1962

3,035,595
FLUID HANDLING STRUCTURE
Elmer C. Beason, Jr., Bartlesville, Okla., assignor to Phillips Petroleum Company, a corporation of Delaware
Filed Oct. 30, 1958, Ser. No. 770,692
3 Claims. (Cl. 137—71)

This invention relates to a fluid handling structure. In one aspect this invention relates to a hydrant valve structure adapted to permit flow therethrough in either direction.

At the present time there is a trend to replace the familiar aircraft servicing tank truck with a fueling system comprising underground conduits supplying fuel from a central storage and pumping facility to a plurality of fuel hydrants located at parking stations on the airfield. In such a fueling system, small mobile servicing trucks having metering and filtering means thereon and provided with suitable connections which connect with said fuel hydrant and the aircraft, are employed at said parking stations. The fuel is delivered from the hydrant through said metering and filtering means on the service truck and then into the aircraft. In most instances, both the truck conduit connecting to the hydrant and the hydrant outlet itself are provided with valves which close automatically when said truck conduit and said hydrant are separated. Although said servicing truck is generally provided with emergency shutdown means, it is desirable that means be provided to shut off flow at the hydrant under emergency conditions. It is also desirable that the hydrant valve be adapted to permit flow in either direction so as to accommodate both fueling and defueling operations.

An object of this invention is to provide an improved structure. Another object of this invention is to provide an improved fluid handling structure having valve means therein adapted to permit flow therethrough in either direction. Another object of this invention is to provide a hydrant valve particularly adapted to be employed in a hydrant fueling system for the fueling and defueling of aircraft. Another object of this invention is to provide a hydrant valve adapted to be employed in aircraft fueling operations and provided with emergency shutdown means. Another object of this invention is to provide a fluid handling structure having valving means therein of simple structure adapted to be opened by direct mechanical action. Another object of this invention is to provide a fluid handling structure having a recess in the exterior wall of the housing thereof, said recess forming a ring of reduced strength, and being adapted to cause said housing to break at said recessed ring in the event of a sharp blow or other unusual stress against said housing. Other aspects, objects, and advantages of the invention will be apparent to those skilled in the art in view of this disclosure.

FIGURE 1 is a cross section of one modification of the fluid handling structure of the invention adapted to permit flow therethrough in either direction and provided with emergency shutdown means. Attached to the upper end of the fluid handling structure of the invention is a mating coupling which cooperates with said fluid handling structure to open the poppet valve in the upper end thereof.

FIGURE 2 illustrates a modification of the fluid handling structure shown in FIGURE 1.

Figure 3:
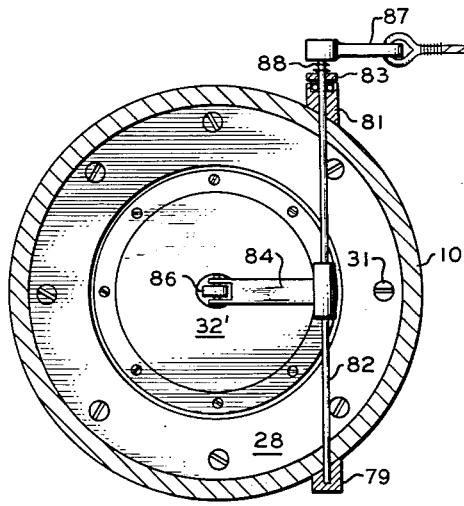
FIGURE 3 is a cross section taken along the lines 3—3 of FIGURE 2.

Referring now to the drawings, wherein like reference numerals are employed to denote like elements, the invention will be more fully explained by describing a modification thereof which is particularly adapted to be employed as a hydrant valve in a hydrant system for the fueling and defueling of aircraft. The embodiment of the invention illustrated in FIGURE 1 comprises a tubular housing 10 having an upper end 11 and an opposite lower end 12, both of which ends are adapted to be connected with fluid handling conduits, as by threads 13 adjacent said upper end 11, and flange 14 at said lower end 12. A first annular valve seat 16 is provided at the upper end of said housing. Said valve seat 16 is mounted on supports 17 and is attached to said supports by means of a plurality of bolts 18. Any other suitable means for mounting said first valve seat at the upper end of said housing can be employed. A first poppet valve 19 is adapted to seat at said first valve seat 16. A ring of gasket material 21, mounted in a groove in said first poppet valve, provides a seating surface on said poppet valve 19. A first valve stem 22 is attached at one end to the underside of said poppet valve 19 and is slidably mounted in a first guideway 23 which is supported within a first chamber 24 (described hereinafter) of said housing by a first plurality of support members 26 attached to said guideway and to an annular support ring resting in a shoulder formed in the inner wall of said housing. A coil spring 27 is mounted around said valve stem 22 between said poppet valve 19 and said support members 26. Said coil spring bears against said poppet valve and said support members and is thus adapted to bias said valve 19 to a normally closed position.

A second annular valve seat 28 is disposed within said housing 10 intermediate said upper and lower ends thereof. Said valve seat 28 is mounted on a plurality of supports 29 by means of a plurality of bolts 31. A second poppet valve 32 is adapted to seat at said second valve seat 28. A ring of gasket material 33, mounted in a groove in said poppet valve 32, provides a seating surface on said valve. Said second annular valve seat 28 and said second poppet valve 32 (when seated) divide the interior of said housing 10 into a first chamber 24 formed between said first and said second valve seats, and a second chamber 34 formed between said second valve seat and said lower end 12 of said housing. A second valve stem 36 is attached at one end to the underside of poppet valve 32 and is slidably mounted in a second guideway 37 supported within said second chamber 34 by a plurality of support members 38 which are attached to said guideway 37 and to the inner wall of said housing. A coil spring 35 is mounted around said valve stem 36 between said second poppet valve 32 and said support members 38 for biasing said poppet valve 32 to normally closed position.

A recess 39, forming a ring of reduced strength, is provided in the exterior wall of said housing at a point intermediate said first valve seat 16 and said second valve seat 28. Said recess 39 thus forms a "breakaway" ring in the wall of the housing of the fluid handling structure. Said "breakaway" ring is provided as an additional safety measure in the event that said housing is struck an accidental blow, as by being struck by a vehicle, or other unusual stress, and in such event will cause housing 10 to break at a point above said second valve seat 28. In such an event, second poppet valve 32 would automatically close because the pressure in first chamber 24 will then be lower than the pressure in second chamber 34 and pressure of the flowing fluid will close valve 32. Flow through the fluid handling structure will then be shut off.

A conduit 41 is formed within the wall of said housing 10 and extends between said first chamber 24 and second chamber 34. Said conduit 41 forms part of a means for equalizing the pressure between chamber 24 and chamber 34 as is explained further hereinafter. A boss member 42 projects from the exterior wall of said housing adjacent said conduit 41. A plunger 43 is slidably mounted in a cavity formed in said boss member. Packing gland 44, together with the O-ring associated therewith, forms a seal for said cavity and plunger. A coil spring 46 mounted around a push rod 47 within said cavity bears against the inner end of said plunger 43 and serves to normally bias said plunger in an outward direction. Said push rod 47 is slidably mounted in and extends through said boss member 42 so as to intersect and block said conduit 41. The outer end of said push rod 47 extends into said cavity and is connected to the inner end of said plunger 43. The inner end of said push rod extends into said first chamber 24. A port 48, extending through said push rod, is adapted to align with said conduit 41 when said push rod is moved inwardly to thus unblock said conduit, and provide communication between said first chamber 24 and said second chamber 34. A lever assembly comprising a first link member 49, a second link member 51, and a third link member 52, pivotally connected to each other at one end of each, is disposed within said first chamber 24. The other end of said first link member 49 is connected by means of a sliding linkage 53 to the inner end of said push rod 47. The other end of said second link member 51 is pivotally connected to said first guideway 23, and the other end of said third link member 52 is pivotally connected to a cylindrical boss member 54 which extends upwardly into said first chamber from the upper side of said second poppet valve 32. When said lever assembly is actuated, as described further hereinafter, said third link member pivots upwardly into recess 56 provided in cylindrical boss member 54. A stop 57 is provided at the upper end of said recess 56 to prevent third lever member 52 from being placed into a vertical position and thus more or less "locking" second poppet valve 32 in an open position. Another way to prevent third link member 52 from obtaining a vertical position is to limit the amount of inward travel of push rod 47 by the length of plunger 43 and the cavity in boss member 42 in which said plunger is mounted. A lever member 58 is pivotally connected to said boss member 42 for pushing said plunger 43 and said push rod 47 inwardly so as to first unblock said conduit 41 when port 48 aligns therewith and then to open said second poppet valve 32 by the force applied through said lever assembly comprising link members 49, 51, and 52 attached to the inner end of said push rod 47.

FIGURE 1 also illustrates a mating coupling 59 attached to housing 10 at threads 13. Said mating coupling comprises a body having a valve seat 61 slidably mounted in the end thereof as shown. A poppet valve 62 is fixed within the body of said mating coupling by means of stem 63 attached to support member 64 as shown. Spring 66 bearing against support member 64 and attached (as by welding) to said valve seat 61 is adapted to bias said valve seat 61 to a position against poppet valve 62 and thereby close the end of said mating coupling when it is uncoupled from housing 10. As here shown, valve seat 61 has been pushed upwardly and away from poppet valve 62 by the action of the upper end 11 of housing 10 as said mating coupling 59 was threaded onto said housing 10. At the same time, poppet valve 62, being fixed, bears against poppet valve 19 in housing 10, compresses spring 27, and thus moves said valve 19 away from valve seat 16.

In the operation of the apparatus illustrated in FIGURE 1, assuming that mating coupling 59 has been coupled to housing 10, poppet valve 19 is biased to an open position by poppet valve 62 as shown, the lower end 12 of housing 10 has been connected at 14 to a hydrant (not shown) and fuel is being pumped into end 12 of said housing, the unblocking of conduit 41 by lifting lanyard 67 so as to cause lever member 58 to push plunger 43 and push rod 47 inwardly to align port 48 with said conduit 41, will cause the pressure in first chamber 24 and second chamber 34 to be equalized. Upon equalization of the pressure in said chambers, further inward movement of push rod 47 will cause sliding linkage 53 to engage the lever assembly comprising link members 49, 51, and 52 to be actuated, and poppet valve 32 will be biased to an open position by the action of said lever assembly. Only sufficient force to overcome spring 35 is necessary to open valve 32 after the pressure in chambers 24 and 34 has been equalized. The fluid handling structure is now completely open and fuel can be pumped therethrough to the aircraft which it is desired to fuel. Flow through said fluid handling structure will continue only so long as plunger 43, push rod 47, and the lever assembly are maintained in an inward position by the action of lever member 48.

If for any reason an emergency arises, and it is necessary to stop flow of fuel as soon as possible, release of lanyard 67 will cause spring 46 to move plunger 43 and push rod 47 in an outward direction, thus releasing the force supplied by lever assembly against second poppet valve 32. Conduit 41 will be blocked by the outward movement of push rod 47, the pressure in chamber 34 will be higher than the pressure in chamber 24, and spring 35, together with the force exerted by the flowing fluid, will cause second poppet valve 32 to close. During fueling operations, lanyard 67 can be secured in a taut position so as to maintain force on said lever assembly within chamber 24 and thus hold poppet valve 32 open. Fusible links 68 are provided in said lanyard 67. In the event of a fire, said fusible links will melt and part which would automatically cause plunger 43 and push rod 47 to be moved outwardly, thus removing force from said lever assembly in chamber 24, and poppet valve 32 would immediately close and shut down the fueling operation.

A further safety feature is provided in recess 39. Said recess 39 provides a ring of reduced strength and if the fluid handling structure is struck an accidental blow, or suffers other unusual stress, housing 10 would break at said recess. Since said recess is positioned above second valve seat 28, the breaking of the housing at this point would cause the pressure in first chamber 24 to be lower than the pressure in chamber 34 and poppet valve 32 would be caused to close.

On defueling operation, i.e., when fluid is being pumped from the aircraft and the flow of fluid through housing 10 is from end 11 toward end 12, the force exerted by the flowing fluid on the upperside of second poppet valve 32 will open said poppet valve 32.

Figure 4:
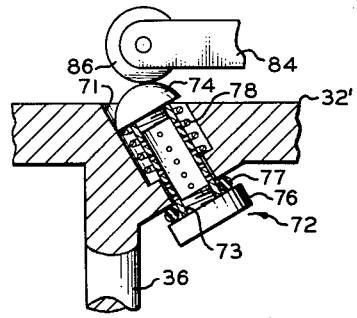
FIGURE 4 is a detail view, partially in cross section, of a portion of the apparatus illustrated in FIGURE 2.
Figure 5:
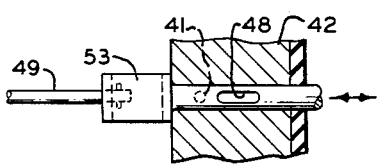
FIGURE 5 is a detail view, partially in cross section, of a portion of the apparatus illustrated in FIGURE 1.

Referring now to FIGURES 2, 3, and 4, there is illustrated a second modification of the fluid handling structure of the invention. In said second modification, the upper portion of the fluid handling structure is exactly the same as the upper portion of the apparatus in FIGURE 1. First poppet valve 19 is, however, illustrated in a closed position. Second poppet valve 32′ and the means for opening same have been modified. A conduit 71 extending through said poppet valve 32′ from said first chamber 24 into said second chamber 34 has been provided. A bleed valve 72 (see FIGURE 4) is mounted in said conduit 71. Said bleed valve comprises a cylindrical body member 73 which is perforated throughout a portion of its length and extends without the lower end of said conduit 71. A perforated cap member 74, having a larger diameter than said cylindrical body member 73, is attached to the upper end of said body member. A lower end member 76 is attached to the lower end of said cylindrical body member. An O-ring 77, or other resilient packing means, is disposed around said cylindrical body member 73 between said lower end member 76 and the underside of said second poppet valve 32'. A coil spring 78 is mounted around said cylindrical body member 73 between said upper cap member 74 and a shoulder formed in the wall of said conduit 71. Said coil spring 78 is adapted to bias said valve 72 to normally closed position.

First and second boss members 79 and 81 (see FIGURE 3) project outwardly from the exterior wall on opposite sides of said housing at points immediately above said second valve seat 28. A rotatable rod 82 extends between said first and second boss members 79 and 81 and extends transversely through said first chamber 24 between the longitudinal axis and the inner wall of said housing 10. One end of said rotatable rod is journaled in said first boss member 79 and the other end of said rotatable rod is journaled in and extends through said second boss member 81. A packing gland 83 is mounted in said second boss member 81 and forms a seal with the extended end of said rotatable rod 82. A lever arm 84 is attached at one end to an intermediate point of said rotatable rod within said first chamber 24 and extends from said rod into contact, by means of roller 86, with said cap member 74 of said bleed valve 72. An actuator lever 87 is attached to the extended end of said rod 82. A coil spring 88 is attached to and mounted between said actuator lever 87 and said packing gland 83 and is adapted to normally rotate and bias said rotatable rod in a direction such that lever arm 84 does not normally exert a force against cap member 74 of bleed valve 72.

It is believed that the operation of the apparatus illustrated in FIGURES 2, 3, and 4 will be apparent to those skilled in the art in view of the above description thereof and the description of the operation of the apparatus illustrated in FIGURE 1. Assuming that a mating coupling 59 has been attached to the upper end of housing 10 as described in connection with FIGURE 1, and it is desired to initiate fueling operation, an upward pull on lanyard 67 will rotate rod 82 so as to move lever arm 84 downwardly into contact with cap member 74 of bleed valve 72. When force is first applied to said bleed valve 72, it will be biased open and fuel will flow through the perforation in upper cap member 74 and the perforations in cylindrical body member 73, and the pressure will be equalized in first chamber 24 and second chamber 34. It is then necessary to apply only sufficient additional force by means of lanyard 67 to cause lever arm 84 to overcome the action of spring 35 and thus open second poppet valve 32'.

Figure 6:
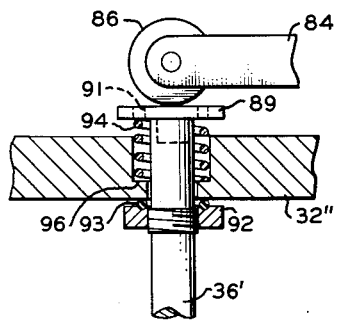
FIGURE 6 illustrates a modification of the pressure equalizing and poppet valve opening means which can be employed in the modification of the invention illustrated in FIGURE 2.

In FIGURE 6, there is illustrated another type of bleed valve which can be employed in the apparatus illustrated in FIGURE 2. In this modification, second valve stem 36' extends through an opening provided in second poppet valve 32''. A disc 89, having perforations 91 in the peripheral portion thereof, is attached to the upper end of said second valve stem 36' which extends into first chamber 24. Said disc 89 is of larger diameter than said second valve stem 36'. An annular valve member 92 is mounted on said second valve stem 36' below and adjacent said second poppet valve 32''. An O-ring 93, or other suitable resilient packing means, is disposed around said second valve stem 36' between said second poppet valve 32'' and said annular valve member 92. A coil spring 94 is mounted around said second valve stem 36' at its upper end between said disc 89 and a shoulder 96 formed in said opening extending through second poppet valve 32''.

In the operation of the apparatus illustrated in FIGURE 6, said coil spring 94, exerting force against disc 89 and said shoulder 96, serves to hold O-ring 93 and valve member 92 in the position shown and thus close said opening through second poppet valve 32''. When a downward force is exerted against disc 89 by means of lever arm 84 and roller 86, in the manner described above in connection with FIGURES 2 and 3, said downward force will first move O-ring 93 out of engagement with the opening through second poppet valve 32'' and thus unblock said opening to provide for equalization of the pressure between first chamber 24 and second chamber 34. Further downward force against disc 89 will cause said disc to contact the upper side of second poppet valve 32'' and said second poppet valve will thus be biased open due to said force overcoming the action of spring 35. (See FIGURE 2.)

It is believed that the advantages of the invention will be apparent to those skilled in the art in view of the above detailed description. The invention provides a fluid handling structure which can be employed in a conduit, such as a fueling and defueling conduit, to control flow of fluid in either direction. It is believed evident that the fluid handling structure of the invention is compact, can be readily installed, and easily maintained. The "breakaway" section provided in the body of housing 10 provides a valuable safety feature which is not to be found in the fluid handling structures or valves of the prior art. It is believed that the direct mechanical action of the valve opening means, and the simplified structure of the invention as a whole, impart obvious advantages which will be readily recognized by those skilled in the art.

While the invention has been described herein and in the claims, in some instances, with reference to an upper and a lower end, and upper and lower poppet valves, as would be the situation when the fluid handling structure is installed in a vertical position, the employ of the fluid handling structure of the invention is not limited to vertical installations. It is believed obvious that said fluid handling structure can also be employed in a horizontal position, or in any other position between a vertical position and a horizontal position.

Likewise, while the invention has been described in terms of a hydrant valve adapted for use in the fueling and defueling of aircraft, the invention is not limited to such use.

Various other modifications of the invention will be apparent to those skilled in the art in view of the above disclosure. Such modifications are within the spirit and scope of the invention.

I claim:

1. A fluid handling structure comprising: a tubular housing with opposite upper and lower ends adapted to be connected with fluid handling conduits, said upper and lower ends each being adapted to serve as an outlet and an inlet respectively when flow is in one direction through said structure, and said upper and lower ends each being adapted to serve as an inlet and an outlet respectively when flow is in the reverse direction through said structure; a first annular valve seat removably mounted in said upper end of said housing; a first poppet valve adapted to seat in said first valve seat; a valve stem attached at one end to the underside of said first poppet valve and slidably mounted in a first guideway supported within a first chamber of said housing by a first plurality of support members attached thereto; spring means mounted around said first valve stem between said first poppet valve and said first support members for biasing said first poppet valve to a normally closed position at said first valve seat, said first valve being adapted however to be mechanically opened when a mating coupling is connected to said one end of said housing; a second annular valve seat removably mounted within said housing intermediate said upper and said lower ends thereof; a second poppet valve adapted to seat in said second valve seat, said second valve seat and said second poppet valve when seated dividing the interior of said housing into said first chamber formed between said valve seats and a second chamber formed between said second valve seat and said lower end of said housing; a second valve stem connected at one end to the underside of said second poppet valve and slidably mounted in a second guideway supported within said second chamber by a second plurality of support members attached thereto and to the inner wall of said housing; a second spring means, mounted around said second valve stem between said second poppet valve and said second support members, for biasing said second poppet valve to normally closed position; a recess, forming a ring of reduced strength, provided exteriorly in the wall of said housing between said first and second valve seats; a conduit formed within the wall of said housing and extending between said first and second chambers; a boss member projecting from the exterior wall of said housing adjacent said conduit; a plunger slidably mounted in a cavity formed in said boss member; spring means within said cavity for biasing said plunger in an outward direction; a push rod slidably mounted in said boss member so as to intersect and block said conduit; the outer end of said push rod extending into said cavity and connected to the inner end of said plunger, and the inner end of said push rod extending into said first chamber; a port extending through said push rod and adapted to align with said conduit when said push rod is moved inwardly to thus unblock said conduit and provide communication between said first and second chambers; first, second, and third link members pivotally connected to each other at one end of each, the other end of said first link member being connected by a sliding linkage to said inner end of said push rod, the other end of said second link member being pivotally connected to said first guideway, and the other end of said third link member being pivotally connected to a cylindrical boss member extending upwardly into said first chamber from the upper side of said second poppet valve; and a lever member pivotally connected to said boss member for pushing said plunger and push rod inwardly so as to first unblock said conduit and then open said second poppet valve.

2. A fluid handling structure comprising: a tubular housing with first and second ends thereof adapted to be connected with fluid handling conduits, said first and second ends each being adapted to serve as an outlet and an inlet respectively when flow is in one direction through said structure, and said first and said second ends each being adapted to serve as an inlet and an outlet respectively when flow is in the reverse direction through said structure; a first poppet valve supported within said housing and normally biased to seating position in a first valve seat at said first end of said housing, and adapted to be mechanically opened when a mating coupling is connected to said first end of said housing; a second poppet valve supported within said housing and normally biased to seating position in a second valve seat disposed within said housing intermediate said first and second ends, said second valve seat dividing the interior of said housing into a first chamber formed between said valve seats and a second chamber formed between said second valve seat and said second end of said housing; a recess, forming a ring of reduced strength, provided in the outer wall of said housing between said first and said second valve seats; a conduit formed longitudinally within the wall of said housing and extending between said first and second chambers; a push rod extending into said first chamber through a boss member projecting from the exterior wall of said housing adjacent said conduit, said push rod intersecting and normally blocking said conduit; a port provided in said push rod and adapted to align with said conduit when said push rod is moved inwardly; a lever assembly operatively connected to said second poppet valve and said push rod within said first chamber; and a lever member pivotally connected to said boss member for moving said push rod inwardly so as to first align said port with said conduit and then actuate said lever assembly to open said second poppet valve.

3. The fluid handling structure of claim 2 wherein said lever assembly comprises: first, second, and third link members pivotally connected to each other at one end of each, the other end of said first link member being connected by a sliding linkage to the inner end of said push rod, the other end of said second link member being pivotally connected to a fixed support member, and the other end of said third link member being pivotally connected to said second poppet valve.

References Cited in the file of this patent

UNITED STATES PATENTS

| | | |
|---|---|---|
| 1,692,296 | Godsey | Nov. 20, 1928 |
| 1,712,498 | Hawxhurst | May 14, 1929 |
| 1,998,913 | Wheaton | Apr. 23, 1935 |
| 2,080,485 | Johnsen | May 18, 1937 |
| 2,556,221 | Samiran | June 12, 1951 |
| 2,563,244 | Holicer | Aug. 7, 1951 |
| 2,729,471 | Fraser | Jan. 3, 1956 |

FOREIGN PATENTS

| | | |
|---|---|---|
| 1,014,867 | Germany (KL. 64c 32/02) | Aug. 29, 1957 |